United States Patent [19]
Kearney

[11] 3,944,175
[45] Mar. 16, 1976

[54] PIPE SUPPORTS AND HANGER

[76] Inventor: Richard J. Kearney, 525 Kennerly Road, Springfield, Pa. 19064

[22] Filed: Oct. 4, 1974

[21] Appl. No.: 512,019

[52] U.S. Cl. .................. 248/59; 248/62; 248/68 R; 248/201
[51] Int. Cl.² ...................... E21F 17/02; F16L 3/22
[58] Field of Search .................. 248/49, 56–63, 248/65, 67.5, 67.7, 68–70, 72, 73, 201, 264, 268

[56] References Cited
UNITED STATES PATENTS

| | | | |
|---|---|---|---|
| 1,374,865 | 4/1921 | Sherwood | 248/59 X |
| 1,904,330 | 4/1933 | Ruff | 248/74 R X |
| 2,271,616 | 2/1942 | Beale | 248/201 X |
| 2,387,951 | 10/1945 | Slater et al. | 248/68 R |
| 2,550,001 | 4/1951 | Button | 248/70 X |
| 3,245,643 | 4/1966 | Morrow | 248/68 R |
| 3,285,552 | 11/1966 | Becker | 248/68 R |
| 3,385,545 | 5/1968 | Patton | 248/68 R |
| 3,404,858 | 10/1968 | Levy | 248/68 R |
| 3,606,217 | 9/1971 | Leiferman | 248/57 X |
| 3,718,307 | 2/1973 | Albanese | 248/205 R |
| D194,803 | 3/1963 | Angel et al. | 248/62 |

FOREIGN PATENTS OR APPLICATIONS

| | | | |
|---|---|---|---|
| 835,220 | 2/1970 | Canada | 248/68 R |

Primary Examiner—Roy D. Frazier
Assistant Examiner—Lawrence J. Staab
Attorney, Agent, or Firm—Weiser, Stapler & Spivak

[57] ABSTRACT

A universal pipe support and hanger for use in roughing in plumbing pipes such as water and waste lines, comprising a central body having formed therein a plurality of right and left water pipe receiving recesses and clamps removably associated therewith. A medial area is provided to affix to a waste pipe in adjustable, spaced relationship. Right and left fixed support members may be provided to be affixed in adjustable, lateral orientation to the central body to support the central body from fixed construction members, such as building columns and beams, large waste pipes and large water pipes.

8 Claims, 11 Drawing Figures

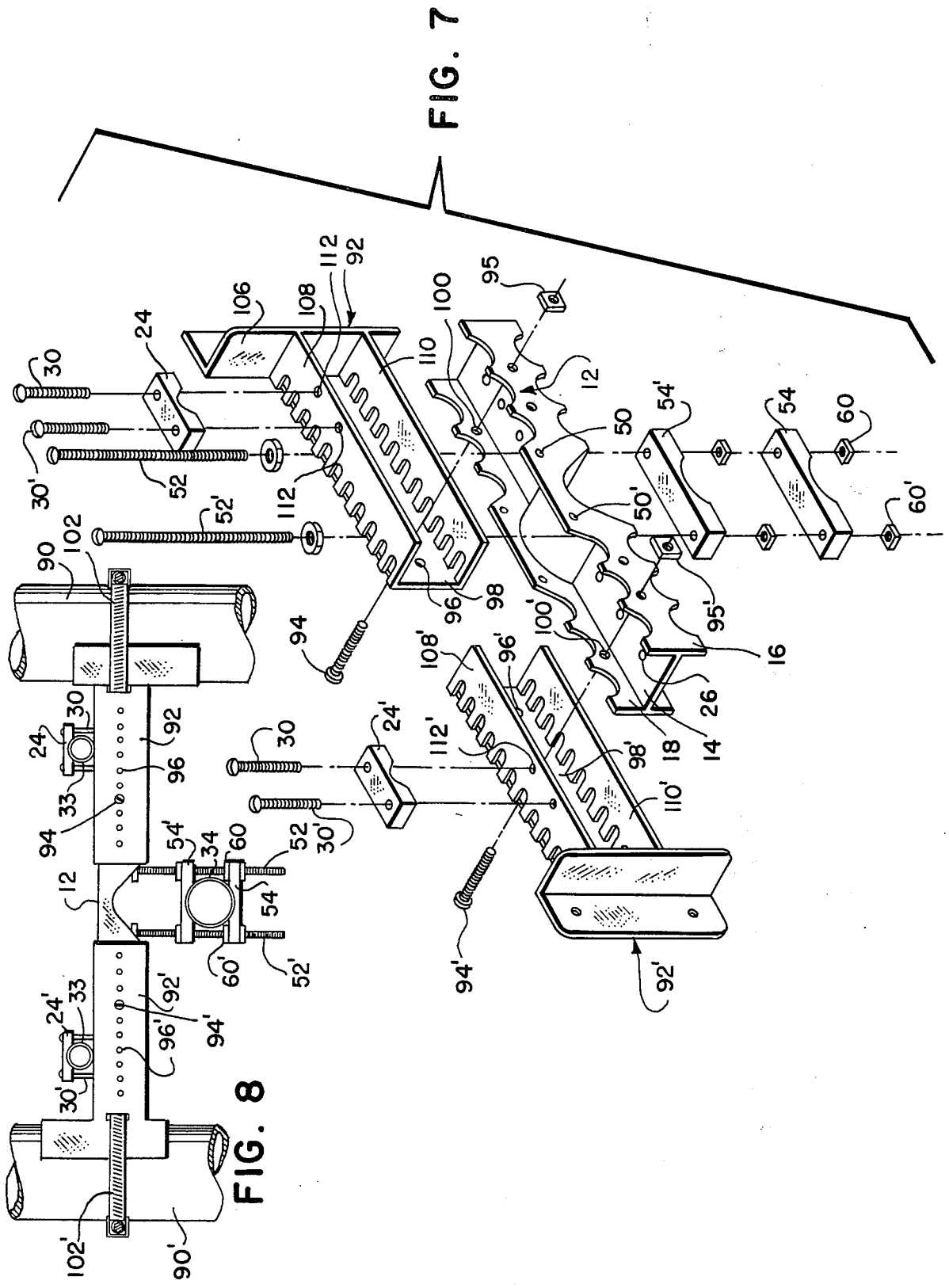

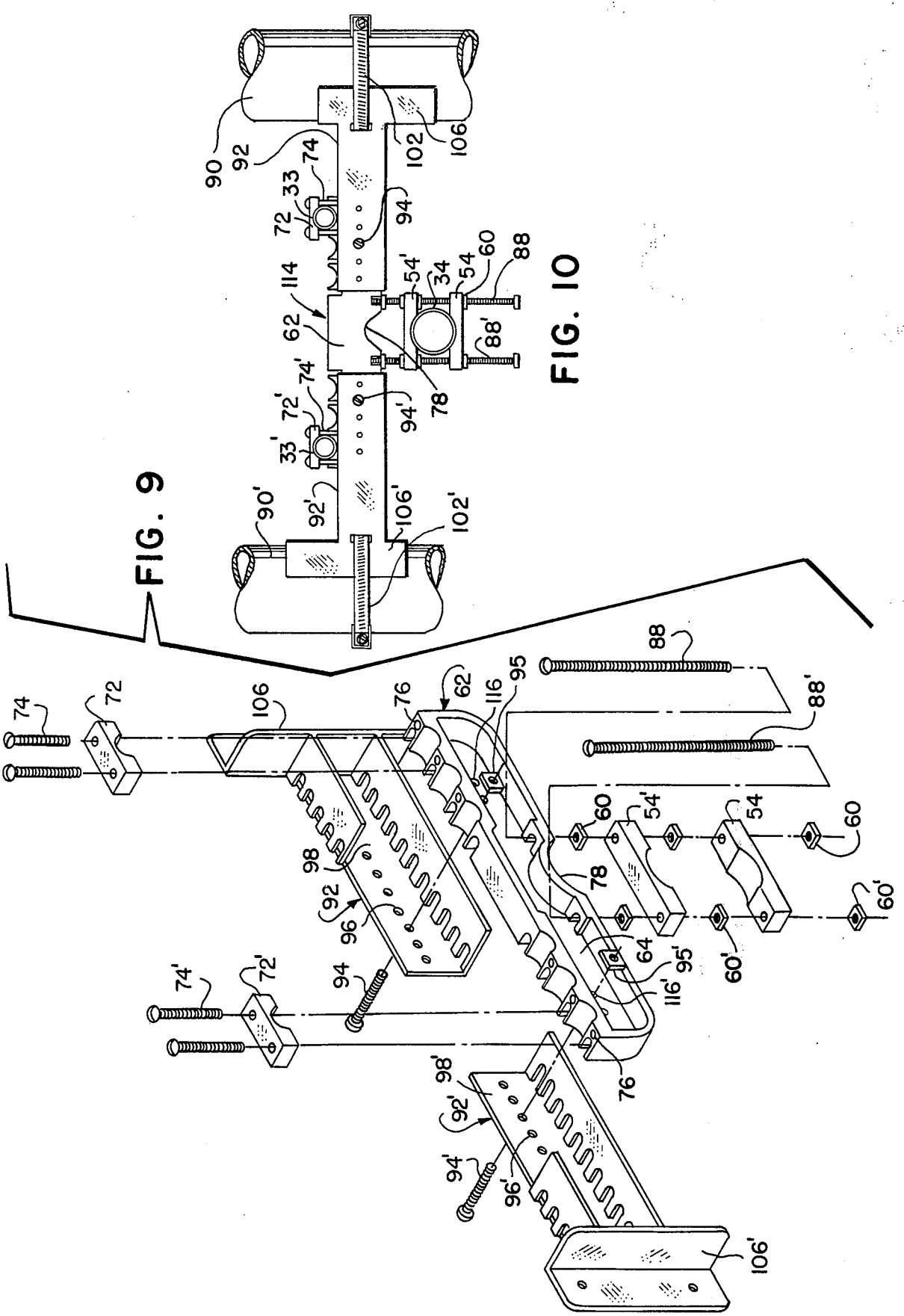

PIPE SUPPORTS AND HANGER

BACKGROUND OF THE INVENTION

The present invention relates generally to the installation of plumbing systems and more particularly, is directed to hangers suitable for roughing in water and waste pipe systems.

In the construction of new buildings, it is necessary to provide a plurality of piping systems such as hot and cold water pipes, drain lines from lavatories, sinks, showers and the like, waste lines from water closets, urinals and similar fixtures, miscellaneous piping systems such as circulating hot water lines, gas piping, hose bib lines, etc. In those buildings wherein extensive toilet room facilities must be provided, such as in schools, industrial plants and other similar installations wherein large numbers of building occupants are contemplated, men's and women's toilet rooms having many fixtures in close proximity must be designed and constructed. In such installations, it will be appreciated that numerous pipes for the various systems must be provided and must be adequately supported during the building construction activities. Failure to adequately support the various piping systems could readily result in sagging, vibration or other undesirable consequences which could lead to rupture, noise, or other defects which could result in plumbing system failure.

In order to prevent such problems within the plumbing systems, prior workers in the art have devised various types of pipe hangers and vibration dampers which are affixed to the pipes at various intervals to provide adequate support. Most often, predesigned pipe hangers have been employed that are fabricated in accordance with individual job specifications and accordingly, can be utilized in only a limited number of locations. Where there are variations in pipe sizes or in pipe spacings, other, different types of hangers must be fabricated and utilized. Because of the great number of variations in pipe design and also, because of the variations encountered due to job conditions, great numbers of different sizes and designs of pipe hangers had to be employed by prior workers in the art. Also, due to special conditions which can arise on the job site, it has been found necessary in many instances to actually hand fabricate hangers on the job to meet special conditions, an undertaking that has proved to be quite time consuming and very costly when considering the high wages which are now commanded by construction workers.

SUMMARY OF THE INVENTION

The present invention relates to a universal type of pipe support and hanger that can be readily assembled in the field to accommodate piping systems in a wide number of configurations.

The present invention includes a combination central body support member having formed thereon a plurality of laterally extending, spaced pipe receiving grooves to receive small water pipes in any one of a number of laterally spaced relations. The central body also includes adjustable means to affix the device to a waste line in any number of vertically spaced positions for adequately support of the device.

In modifications thereof, one or more laterally adjustable fixed supports can be adjustably attached to the central body to affix the combination device to stationary building construction members, such as columns, large soil pipes, etc., in a manner that can be readily adjustable in the field to suit existing conditions. If desired, the lateral fixed support members can also be provided with pipe clamps to receive and support additional water pipes in laterally adjustable positions.

The entire device with the exception of the fasteners is preferably fabricated of a non-conductive, non-corrosive material, such as polyethylene or polystyrene plastic to thereby insulate the various piping systems, one from the other, to prevent the passage of electrical energy and to provide electrolytic isolation.

The present invention includes four basic parts which may be interconnected in various combinations in accordance with job conditions to give a multiplicity of pipe support configurations to thereby accommodate substantially any pipe system design which would normally be encountered in the field by utilizing the various adjustment features built into the four interacting component parts. By employing the basic parts of the present invention in adjustably arranged orientation, the device can be field assembled in a relatively short period of time to provide a fully acceptable pipe support system at extremely low cost by workmen using conventional tools and requiring no special training or instruction prior to becoming proficient in its use.

It is therefore an object of the present invention to provide an improved pipe support and hanger system of the type set forth.

It is another object of the present invention to provide a novel pipe support and hanger system which employs four basic parts which are all adjustably interconnected to permit wide adjustment.

It is another object of the present invention to provide a novel pipe support and hanger system including a basic central body element including means to receive and support small water pipes in a plurality of laterally adjustable positions and to affix to a vertical waste pipe in laterally and vertically adjustable positions.

It is another object of the present invention to provide a novel pipe support and hanger comprising a central body member having means to laterally adjustably support a plurality of small pipes and having means to affix to a waste pipe in any one of a number of vertically and transversely adjustable positions.

It is another object of the present invention to provide a novel pipe support and hanger including a plurality of basic elements which can be adjustably interconnected, some of said basic elements including means to affix to stationary portions of a building construction.

It is another object of the present invention to provide a novel pipe support and hanger system that includes a plurality of basic elements which adjustably interconnect to provide a plurality of adjustable pipe receiving recesses which are further adjustably interconnected to provide a device capable of accommodating pipes which are arranged in any of a number of laterally and vertically oriented positions.

It is another object of the present invention to provide a novel pipe support and hanger system that is simple in design, inexpensive in manufacture and trouble free when in use.

Other objects and a fuller understanding of the invention will be had by referring to the following description and claims of a preferred embodiment thereof, taken in conjunction with the accompanying drawings, wherein like reference characters refer to similar parts throughout the several views and in which:

BRIEF DESCRIPTION OF THE DRAWINGS

FIG. 7 is an exploded perspective view of the central body of FIG. 1 and utilized in conjunction with a pair of right and left laterally adjustable fixed support members.

FIG. 8 is a side elevational view on reduced scale of the parts of FIG. 7 as connected together to support a pair of transversely spaced pipes.

FIG. 9 is an exploded, perspective view of the central body of FIG. 3 as applied to a pair of right and left, transversely adjustable fixed support members.

FIG. 10 is a side elevational view, at reduced scale, of the members of FIG. 9 fully assembled to support a pair of laterally positioned pipes.

DESCRIPTION OF THE PREFERRED EMBODIMENT OF THE INVENTION

Figures 1, 1A, 2:
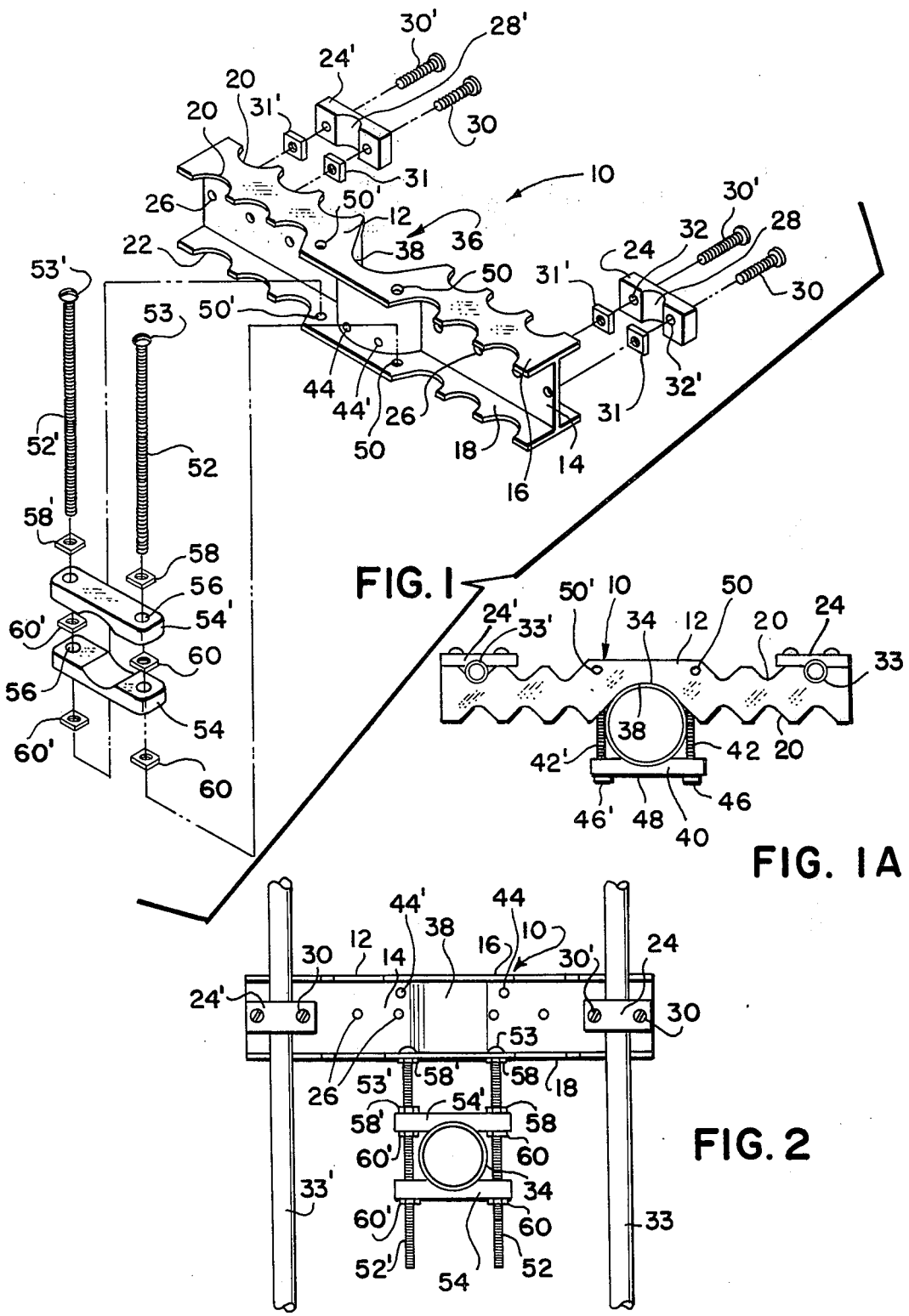
FIG. 1 is an exploded, perspective view showing a first embodiment of a central body which is fabricated in accordance with the present invention.
FIG. 1A is a top plan view of the device of FIG. 1 showing the pipe clamp positioned at 90° from the pipe clamp of FIG. 1.
FIG. 2 is a side elevational view of the device of FIG. 1 in use and supporting a pair of transversely spaced pipes.

Although specific terms are used in the following description for the sake of clarity, these terms are intended to refer only to the particular structure of my invention selected for illustration in the drawings, and are not intended to define or limit the scope of the invention.

Referring now to the drawings, I show in FIG. 1, 1A and 2 a pipe support 10 which includes a central body 12 which is formed to a generally H-shaped cross sectional configuration having a central web section 14 and a pair of lateral flanges 16, 18 integrally formed therewith. The flanges 16, 18 are preferably formed with a plurality of right and left transversely and vertically aligned recesses 20, 22 which are curved to a suitable diameter to receive and retain the small pipes 33, 33' therein, for example, water pipes of sizes ½ through 1 inch. Cooperating right and left clamps 24, 24' each having a cooperating recessed area 28, 28' are affixed to the web section 14 by employing pairs of conventional threaded fasteners 30, 30'. It will be noted that the web is drilled or otherwise provided with a plurality of longitudinally aligned, transversely spaced holes 26 which are positioned intermediate the adjacent, transversely spaced recesses 20 in the flange 16 and the corresponding recesses 22 in the flange 18. Each of the clamps 24, 24' is provided with a pair of openings 32, 32' which are spaced to register over adjacent web holes 26 when the clamps 24, 24' are applied to the web 14. In this manner, by aligning the clamp openings 32, 32' over adjacent web holes 26 and turning the fasteners 30, 30' through the aligned holes, the clamps 24, 24' can be tightly drawn against the web to clamp a small water or other type of pipe 33, 33' therebetween. The large number of spaced, aligned recesses 20, 22 and the holes 26 in the web 14 permit the device to be employed to support pipes 33, 33' in a wide variety of laterally spaced positions.

In order to attach the pipe 10 to a larger waste pipe to support the entire device, a medial support area 36 is formed in the central body 12. The medial support area 36 comprises a relatively large, arcuately curved, transversely aligned waste pipe contact section 38 which can be employed directly with a pipe clamp 40 for waste pipe clamping purposes. In this arrangement (see FIG. 1A) a pair of elongated fasteners 42, 42', which may be in the form of threaded bolts, are threadedly connected into a pair of spaced holes 44, 44' which are drilled through the web section 14 longitudinally adjacent to the pipe contact section 38. The bolt heads 46, 46' position outwardly of the outer surface 48 of the pipe clamp 40 and serve to pull the pipe clamp 40 into peripheral contact with a waste pipe 34 when the bolts 42, 42' are threadedly turned into the respective web holes 44, 44'. The pipe clamp 40 cinches the central body 12 to the waste pipe 34 in a simple, extremely rigid and strong connection. In this configuration, it will be noted that the longitudinal axis of the pipe 34 is parallel to the transverse alignment of the waste pipe contact section 38.

In the configuration illustrated in FIGS. 1, 1A and 2, the lateral flanges 16, 18 are each provided with a pair of spaced holes 50, 50' near the contact section 38, which are employed to receive a pair of elongated waste pipe clamp bolts 52, 52'. Optionally, a pair of additional web holes 44, 44' can be employed to receive the bolts 52, 52A in an offset position of ninety degrees (see FIGS. 1A and 2). The bolt heads 53, 53' position interiorly of the flanges 16, 18 and the bolts 52, 52' extend at right angles to planes drawn through the flanges 16, 18. A pair of similar, opposed waste pipe clamps 54, 54' are each provided with a pair of spaced openings 56 of a size to receive a bolt 52, 52' and to be a sliding fit thereon. Upper nuts 58, 58' are adjustably threaded onto the bolts 52, 52' for adjustment purposes to space the waste pipe clamps 54, 54' at any predetermined distance from the associated flange 16 or 18. Thus, by adjusting the position of the nuts 58, 58', 60, 60' on the elongated bolts 52, 52', the clamp 54' can be readily secured in any adjustable position relative to the central body 12 along the entire length of the elongated bolts 52, 52'. Sufficient additional nuts 60, 60' are provided to permit the assembly including the clamp 54 to be rigidly secured to a waste pipe 34 by simply tightening the respective nuts against the pipe clamps 54, 54'.

As seen in FIG. 1A, by employing the waste pipe contact section 38, a single pipe clamp 40 and bolts 42, 42' which secure through the web openings 44, 44', the central body 12 can be clamped to a pipe 34 with the web section 14 in parallel alignment with the longitudinal axis of the pipe 34. It will be noted that if desired, the bolts 42, 42' and the pipe clamp 40 (FIG. 1A) can be replaced with the clamping assembly of FIGS. 1 and 2 by employing elongated bolts 52, 52', upper and lower pipe clamps 54, 54' and sufficient nuts 58, 58' and 60, 60' to permit the waste pipe 34 to be clamped in adjustable spaced relationship from the central body 12. By drilling the flanges 16, 18 to provide the openings 50, 50', and the web 14 to provide the openings 44, 44', the central body 12 can then be universally adaptable to position the central web section 14 either in alignment with the longitudinal axis of the pipe 34 or at right angles thereto. In this manner, the central body 12 can be employed for small pipe 33, 33' clamping purposes in an infinite number of vertically and horizontally adjustable positions to thereby accommodate an infinite number of waste pipe 34 and water pipe 33, 33' arrangements.

Figure 3:
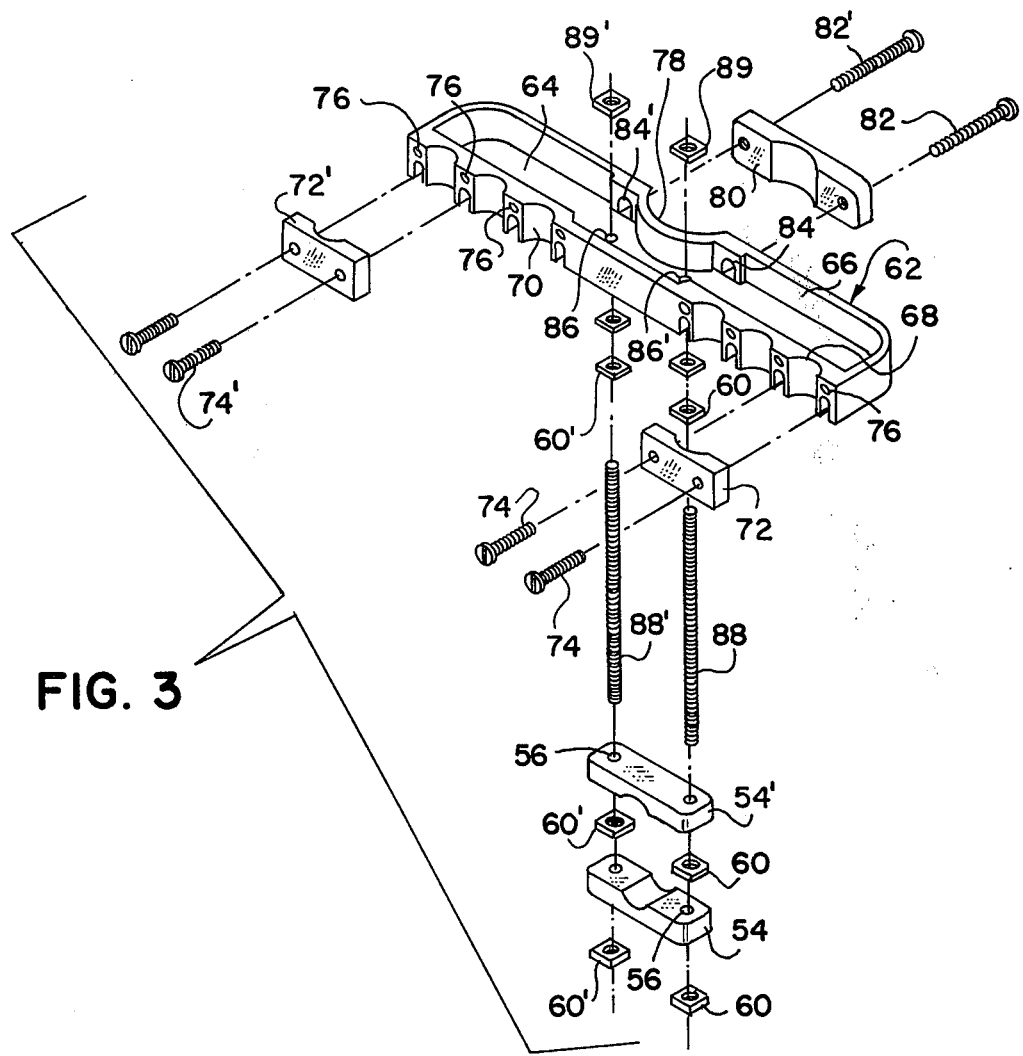
FIG. 3 is an exploded, perspective view of a modified central body.
Figure 4:
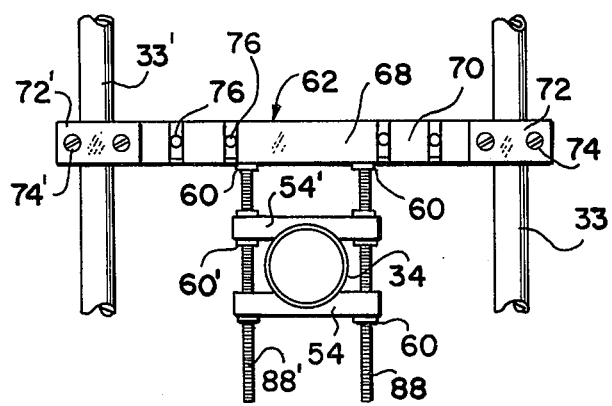
FIG. 4 is a side elevational view showing the central body of FIG. 3 in use to support a pair of laterally spaced pipes.

Turning now to FIGS. 3 and 4, I show a modified central body 62 of generally channel-shaped, cross sectional configuration having a central web 64, and an upper and lower flange 66, 68 integrally connected and extending at right angles thereto. One flange 68 is provided with a plurality of recesses 70 which cooperate with small pipe clamps 72, 72' to clamp a small pipe 33, 33' in any one of a plurality of laterally adjusted positions by employing conventional threaded fasteners 74, 74' which turn in the spaced holes 76 provided in the flange 68 intermediate the recesses 70. A curved waste pipe contact section 78 is integrally formed in the upper flange 66 which may be utilized to secure the modified central body 62 to a waste pipe 34 by employing a pipe clamp 80 in diametrically opposed relation. A pair of fasteners 82, 82' turn through respective openings 84, 84' which are provided in the upper flange 66 to secure the central body 62 to the waste pipe 34 in a secure manner. In this manner, the central body 62 can be secured to a waste pipe 34 with the plane of the web 64 positioned at right angles to the longitudinal axis of the waste pipe 34.

In order to render the central body 62 more universally adaptable to other pipe configurations encountered on the job, the central web 64 is additionally drilled to provide a pair of spaced openings 86, 86' which receive therein a pair of elongated bolts 88, 88' which can be secured conventionally in the openings 86, 86' by means of threaded nuts 89, 89'. A pair of similar waste pipe clamps 54, 54' are equipped with openings 56 to slide over the elongated bolts 88, 88'. Suitable nuts 60, 60' are threadedly engaged on the elongated bolts 88, 88' to securely affix the clamps 54, 54' in any desired longitudinally adjusted position along the bolts 88, 88' to secure the modified central body 62 to the waste pipe 34. In this configuration, it will be noted that a plane drawn through the central web 64 will be parallel to the axis of the waste pipe 34 and will be positioned at right angles to the axes of the small water pipes 33, 33' which are clamped in position by the modified central body 62.

Figure 6:
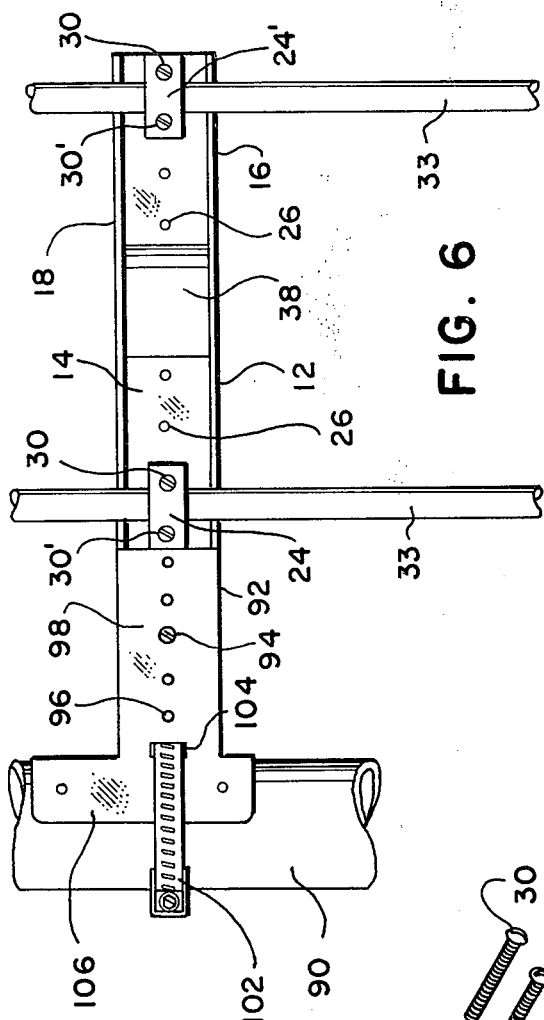
FIG. 6 is a side elevational view of the parts of FIG. 5 which are joined together to support a pair of laterally spaced pipes.
Figure 5:
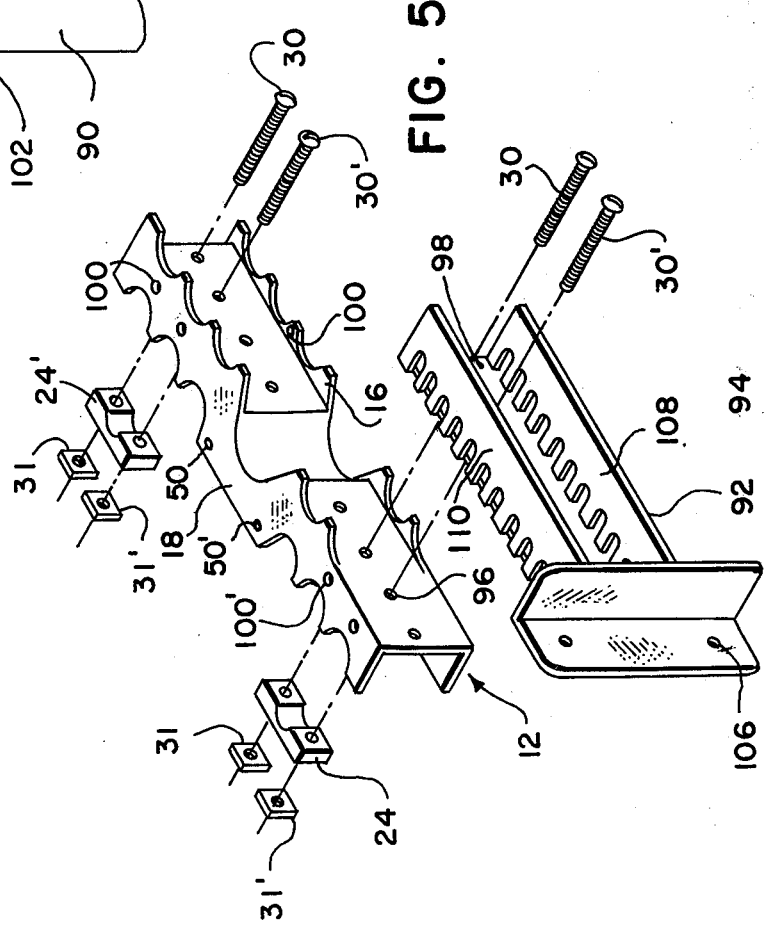
FIG. 5 is an exploded, perspective view showing the central body similar to that illustrated in FIG. 1 in conjunction with a laterally adjustable positioned right fixed support member.

Referring now to FIGS. 5 and 6, I show a method whereby the central body 12 as illustrated in FIGS. 1, 1A and 2 can be secured to a stationary portion of the building construction, for example, a large soil pipe 90 by employing a lateral clamp member 92 as an extension to the central body 12. One or more bolts 94 secure the lateral clamp member 92 to the central body 12 in a predetermined, laterally adjustable position. The clamp member 92 is provided with a plurality of laterally spaced openings 96 to facilitate securing the member 92 to the central body 12 in the desired position. In this regard, one or more of the spaced openings 96 are aligned with one or more openings 26 which are provided in the web 14 of the central body 12 and the bolts 94 are inserted therethrough. In this orientation, the central web 98 of the lateral clamp member 92 is arranged in parallel alignment with the web section 14 of the central body 12. Optionally, the openings 96 could be aligned over one or more flange openings 100 which could be drilled or otherwise machined in the flanges 16, 18 of the central body 12. In this manner, by employing bolts 94 which insert through aligned clamp member openings 96 and central body flange openings 100, the parts can be readily assembled with the central web 98 of the clamp member 92 arranged at right angles (not illustrated) to the web section 12 of the central body 12.

Thus, the lateral clamp member 92 can be easily affixed to the central body 12 in positions which are oriented at ninety degrees from each other to thereby render the combination readily adjustable to any vertical or horizontal building member, such as the soil pipe 90 for clamping purposes. An adjustable clamp 102 encircles the soil pipe 90 and positions through an elongated opening 104 which is sized to receive the pipe clamp 102. The lateral clamp member 92 terminates inwardly in an L-shaped contact member 106 which is tightly drawn against the building construction member 90 by the clamp 102 to laterally support the combination of the central body 12 and the lateral clamp member 92. The central web 98 carries a pair of integral, depending flanges 108, 110 which overfit the flanges 16, 18 of the central body in sliding relationship to thereby provide an easily adjustable, extremely strong connection. The water pipes 33, 33' are connected to the assembled device by employing right and left pipe clamps 24, 24' and the threaded fasteners and nuts 30, 30' and 31, 31'.

Referring now to FIGS. 7 and 8, I show the central body 12 connected to a pair of laterally opposed right and left clamp members 92, 92' to thereby permit the assembled device to be easily clamped to a pair of laterally spaced members, such as large soil pipes 90, 90'. The right and left clamp members 92, 92' can be adjustably secured to the central body 12 by aligning the respective web openings 96, 96' with either the central body web openings 26 or the right and left flange openings 100, 100' which are provided in the central body 12 and by employing the bolts 94, 94' and nuts 95, 95' for this purpose. Thus, the right and left clamp members 92, 92' can be secured in any desired laterally adjustable position relative to the central body 12 by aligning desired holes in the clamp members 92, 92' with holes which are provided in the central body 12. Also, the lateral clamp members 92, 92' can be adjustably connected to the central body 12 in any rotatively oriented position at 90° increments by aligning the web opening 96, 96' in the clamp members 92, 92' with either the central web openings 26 of the central body 12 or the flange openings 100, 100' that are provided in the flanges 16, 18 of the central body 12.

By employing the configuration set forth in FIGS. 7 and 8, small water pipes 33, 33' can be easily clamped in the manner herein set forth by employing right and left small pipe clamps 24, 24' and suitable fasteners 30, 30'. Further, a small fixture waste pipe 34 can also be clamped into the system in the manner hereinbefore set forth by employing upper and lower clamps 54, 54', suitable elongated bolts 52, 52' and nuts 60, 60'. Accordingly, when a pair of laterally spaced structural members, for example, large soil pipes 90, 90' are in place in the building, the combined members of FIGS. 7 and 8 can be employed as the device is laterally adjustable through a wide size range to facilitate connecting to the two adjacent members 90, 90' with a minimum of time and effort. The laterally spaced openings 96, 96' in the right and left clamp members 92, 92' are aligned with respective central body clamp openings 26 or flange openings 100 and the parts are secured in place by means of the threaded fasteners 94, 94' and nuts 95, 95'. Once the necessary lateral adjustment of the parts has been accomplished, suitable clamping members, for example, adjustable pipe clamps 102, 102' are tightened in position about the stationary structural members 90, 90' to thereby provide an extremely sturdy and readily assembled pipe clamping arrangement. If desired, and if necessary for job conditions, the flanges 108, 108' and 110, 110' of the lateral clamp members 92, 92' can be drilled to provide a pair of spaced openings 112, 112', to receive the bolts 30, 30' therein to facilitate connection of the small pipe clamps 24, 24' in widely spaced clamping arrangement.

Referring now to FIGS. 9 and 10, I show an assembly 114 which employs the modified central body 62 as illustrated in FIGS. 3 and 4 with one or more lateral clamp members 92, 92'. In the embodiment illustrated, the central web 64 of the modified central body 62 is drilled or otherwise treated to provide a plurality of laterally spaced openings 116, 116' therein. The lateral clamp members 92, 92' can then be readily affixed to the central body 62 by employing suitable bolts 94, 94' and nuts 95, 95' and by aligning one of the spaced openings 96, 96' which are respectively provided in the webs 98, 98' of the lateral clamp members 92, 92'. Thus, the clamp members 92, 92' can be securely affixed to the modified central body 62 in any one of a number of easily adjustable, laterally spaced positions simply by aligning a different clamp opening member 96, 96' with a central body opening 116, 116'.

As seen in FIG. 10, the assembly 114 can be readily adjusted and clamped between adjacent structural members such as large soil pipes 90, 90' by employing the pipe clamps 102, 102' to tie the L-shaped contact members 106, 106' tightly to the fixed construction. In this manner, the small water pipes 33, 33' can be easily secured in any desired lateral position by employing the right and left pipe clamps 72, 72' and suitable threaded fasteners 74, 74' in the manner hereinbefore set forth. Further, a small fixture waste line 34 can be clamped to the central body 62 by employing either the waste pipe contact section 78 and a waste pipe clamp 80 as ilustrated in FIG. 3 or by employing a pair of pipe clamps 54, 54' which are longitudinally spaced along the pair of elongated bolts 88, 88' by employing suitable nuts 60, 60'. In the embodiment illustrated, it will be noted that the central web 64 of the modified central body 62 is aligned in parallel relationship with the central webs 98, 98' of the lateral clamp members 92, 92' in the manner illustrated by aligning web openings 96, 96' over central web openings 116, 116' of the modified clamping member 62. Optionally, the webs 98, 98' of the lateral clamp members 92, 92' can be positioned at right angles to the web 64 of the modified central body 62 by aligning the respective laterally spaced openings 96, 96' of the pipe clamp holes 76 which are provided in the flange 68 of the central body 62. Thus, an assembly 114 has been provided which permits wide lateral adjustment by means of the laterally adjustable clamp members 92, 92' which can be readily oriented to accommodate vertical or horizontal stationary construction 90, 90' or vertical or horizontal small water pipes 33, 33' or vertical or horizontal small fixture waste pipes 34 simply by properly orienting the parts to meet the job conditions.

Although I have described the present invention with reference to the particular embodiments herein set forth, it is understood that the present disclosure has been made only by way of example and that numerous changes in the details of construction may be resorted to without departing from the spirit and scope of the invention. Thus, the scope of the invention should not be limited by the foregoing specification, but rather only by the scope of the claims appended hereto.

I claim:

1. In a universal pipe support and hanger employing a central body comprising a planar web and a pair of connected flanges wherein the central body is provided with an arcuately curved, transversely aligned, waste pipe contact section, and the flanges are provided with a plurality of longitudinally spaced small pipe receiving recesses, the improvement comprising
   A. waste pipe clamp means maintained in fixed relationship to the central body to clamp the central body to a waste pipe which has a longitudinal axis, said central body having right and left ends,
      1. said waste pipe clamp means including a pair of elongated fasteners, a first pipe clamp secured by the fasteners, and a second pipe clamp secured by the fasteners,
      2. said waste pipe clamp means including means to orient the plane of the web either in alignment with or at right angles to the longitudinal axis of the waste pipe, and
      3. means to secure said first and second pipe clamps in a plurality of positions spaced from the central body,
      4. said first and second pipe clamps securing the waste pipe therebetween to secure the support and hanger in stationary position.

2. The invention of claim 1 wherein central body web is provided with a first pair of spaced openings and wherein at least one of the flanges is provided with a pair of second spaced openings, the fasteners being engaged in either the pair of first or second spaced openings to maintain the pipe clamp in spaced relationship from either a flange or from the central web.

3. The support and hanger of claim 2 wherein the web openings and the flange openings are provided in the central body immediately adjacent the said waste pipe contact section.

4. The support and hanger of claim 1 wherein the means to secure comprise the said elongated fasteners and first pipe clamp in combination with the second pipe clamp and a plurality of nuts threadedly engaged on the fasteners to affix the first and second pipe clamps in any one of a plurality of spaced positions from the central body at least one of the pipe clamps being secured to the fastener by a nut positioned above the clamp and a second nut positioned below the clamp.

5. The support and hanger of claim 4 and a lateral clamp member secured to one end of the central body, said clamp member having a web and at least one flange extending from the web, said clamp member terminating outwardly in a fixed construction contact member and inwardly in a central body rceiving end, said clamp member being provided with at least one opening and said central body being provided with an opening, the clamp member opening and the central body opening being in alignment and a fastener inserted through the aligned openings to secure the central body and the clamp member together.

6. The support and hanger of claim 5 and means to secure the central body to the clamp member with the clamp member web parallel to the central body flanges and wherein the clamp member includes a resilient pipe clamp.

7. The support and hanger of claim 6 wherein the means to secure the central body to the clamp member comprises the flanges of the central body being provided with a plurality of spaced openings and the web of the clamp member being provided with a plurality of spaced openings whereby the clamp member can be secured to the central body by aligning an opening in the central body flange with an opening in the clamp member web and a fastener inserted within the aligned openings.

8. The support and hanger of claim 7 wherein the spacing between the openings in the central body flanges is equal to the spacing between the openings in the clamp member web whereby a plurality of fasteners can be employed and wherein the clamp member includes at least one opening, a portion of the resilient pipe clamp being positioned in the opening.

* * * * *